Sept. 9, 1958      W. K. LONG      2,850,941

DEVICE FOR MEASURING LIGHT TRANSMISSION

Filed Aug. 10, 1955      3 Sheets-Sheet 1

INVENTOR.
WALTER K. LONG
BY Richard von K. Bruno
Attorney

Sept. 9, 1958 W. K. LONG 2,850,941
DEVICE FOR MEASURING LIGHT TRANSMISSION
Filed Aug. 10, 1955 3 Sheets-Sheet 2

INVENTOR.
WALTER K. LONG
BY
Attorney

Sept. 9, 1958  W. K. LONG  2,850,941
DEVICE FOR MEASURING LIGHT TRANSMISSION
Filed Aug. 10, 1955  3 Sheets-Sheet 3

INVENTOR.
WALTER K. LONG
BY Richard von K. Bruns
Attorney

United States Patent Office 2,850,941
Patented Sept. 9, 1958

2,850,941

DEVICE FOR MEASURING LIGHT TRANSMISSION

Walter K. Long, Auburn, N. Y., assignor to Welch Allyn, Inc., Skaneateles Falls, N. Y., a corporation of New York Application August 10, 1955, Serial No. 527,618

3 Claims. (Cl. 88—14)

This invention relates generally to optical measurement devices, and has particular reference to optical measurement devices of the class which employ optical wedges to measure the amount of light transmitted by translucent substances, such measurements enabling certain other characteristics of the substances to be determined. Various types of colorimeters, densitometers, pyrometers, hemoglobinometers and the like operate in this manner, and the novel features of the present invention can be effectively utilized in any of these devices. The invention is particularly adapted, however, for use in connection with hemoglobinometers and will therefore be described in the following paragraphs with reference to this type of device.

The purpose of a hemoglobinometer is to determine the hemoglobin content of a test sample of blood, and many different types of hemoglobinometers have been developed heretofore. Most of the early hemoglobinometers employed some kind of a colored standard with which the blood sample was compared. Sometimes the standard was in the form of a colored solution, but the more frequent practice was to use a colored solid, such as ruby glass, in slab or wedge form. None of the devices using a colored standard have proved to be very accurate or reliable, however, because it is extremely difficult to obtain an exact color match between colors in different mediums and also because the eyesight of different observers may vary considerably with respect to their reaction to color.

Because of the disadvantages inherent in hemoglobinometers employing colored standards, various attempts have been made to provide more accurate and dependable devices. As a result, improved instruments such as the photoelectric cell hemoglobinometer and hemoglobinometers utilizing neutrally tinted optical wedges have been developed, and these are in use at the present time along with some less expensive devices which still employ colored standards or variations thereof. Unfortunately, the photoelectric cell hemoglobinometer is relatively expensive and is sometimes liable to errors in calibration, while the instruments utilizing neutrally tinted optical wedges have the disadvantage that no two wedges are exactly alike so that each wedge must be individually calibrated.

In the latter type of hemoglobinometer, which is most closely related to the present invention, the blood solution is balanced directly against a variable reading wedge as disclosed in United States Patent No. 2,355,960 to Duffie and British Patent No. 637,009 of 1949, which patents show the use of straight and circular wedges respectively. In both of the patented devices, the use of filters opaque to the color of the blood and neutrally tinted wedges eliminates the disadvantages attendant on comparing colors above referred to and reduces the comparison to one of light intensity or luminosity. The wedges, however, are made either by a pigment suspended in gelatine method or by a progressive photographic exposure method and neither of these insures uniform gradation on the wedge so that each must be individually calibrated, making the devices more expensive to produce. Thus, even though some improvements have been made in hemoglobinometers, none of those in use at the present time have broad utility since the devices which can be produced at a low enough cost to be within the means of the average practitioner are usually difficult to use with any degree of accuracy, while those which insure a higher degree of accuracy are so expensive that they can only be purchased by hospitals and clinics.

The primary object of the present invention, therefore, is to provide a hemoglobinometer or the like which has none of the major limitations or disadvantages of the devices of the prior art, the subject hemoglobinometer having a novel principle of operation which not only insures highly accurate results but enables the device to be produced at a relatively low cost.

Another very important object of the invention is to provide a hemoglobinometer that is so calibrated that the percentage content of hemoglobin in the blood can be quickly as well as accurately determined.

A further important object of the invention is to provide a hemoglobinometer wherein the operation of the instrument is so accurate within itself that any discrepancies in results can be traced to the technical process of blood selection and the measurement of the solution involved.

Still another important object of the invention is to provide a hemoglobinometer which is simple in construction and requires no scientific knowledge to use, thus making it possible for the physician to leave the testing of blood samples to an assistant with the assurance that accurate results will be obtained.

A still further important object of the invention is to provide a hemoglobinometer which is compactly built and of durable construction so that it can be easily carried about without any likelihood of damage to its working parts.

A more specific object of the invention is to provide a hemoglobinometer having an entirely new type of optical wedge, said wedge having a constant reading portion as well as a variable reading portion and being produced in such a manner that the calibration of the wedge is a function of the two portions so that the wedge is, in effect, calibrated against itself. This, as will become more apparent hereinafter, permits the wedge to be produced by mass production methods and is a prime factor in enabling the subject hemoglobinometer to be produced at a relatively low cost.

A further specific object of the invention is to provide a hemoglobinometer wherein the use of an optical wedge having constant and variable reading portions enables both halves of the matching field to be of the same tone consistency thereby making it possible for the hemoglobinometer to be used by observers with different eyesight conditions.

Another specific object of the invention is to provide a hemoglobinometer wherein the optical wedge is of a warm gray-purple tone which, when used with a green filter, has a color vibration ray absorption of the red fields and associated hues from yellow to red-brown, said wedge being particularly balanced for the red of the blood solution.

Still another specific object of the invention is to provide a hemoglobinometer having a single source of illumination which in its many variations will not effect the accuracy of the reading.

Another specific object of the invention is to provide a hemoglobinometer which is so constructed that the light rays from the source of illumination pass diametrically through the vial containing the blood solution.

A further specific object of the invention is to provide a hemoglobinometer having an improved form of pattern aperture which materially aids in matching the light intensity on the two halves of the matching field.

A still further specific object of the invention is to provide a hemoglobinometer wherein the calibrated scale is imprinted on the optical wedge, said scale being lighted by the instrument's source of illumination and being observable at a convenient location on the instrument.

Other objects and advantages of the invention will become apparent from the following detailed description thereof read in conjunction with the accompanying drawings which illustrate a preferred embodiment of the invention for the purpose of disclosure.

Figure 1:
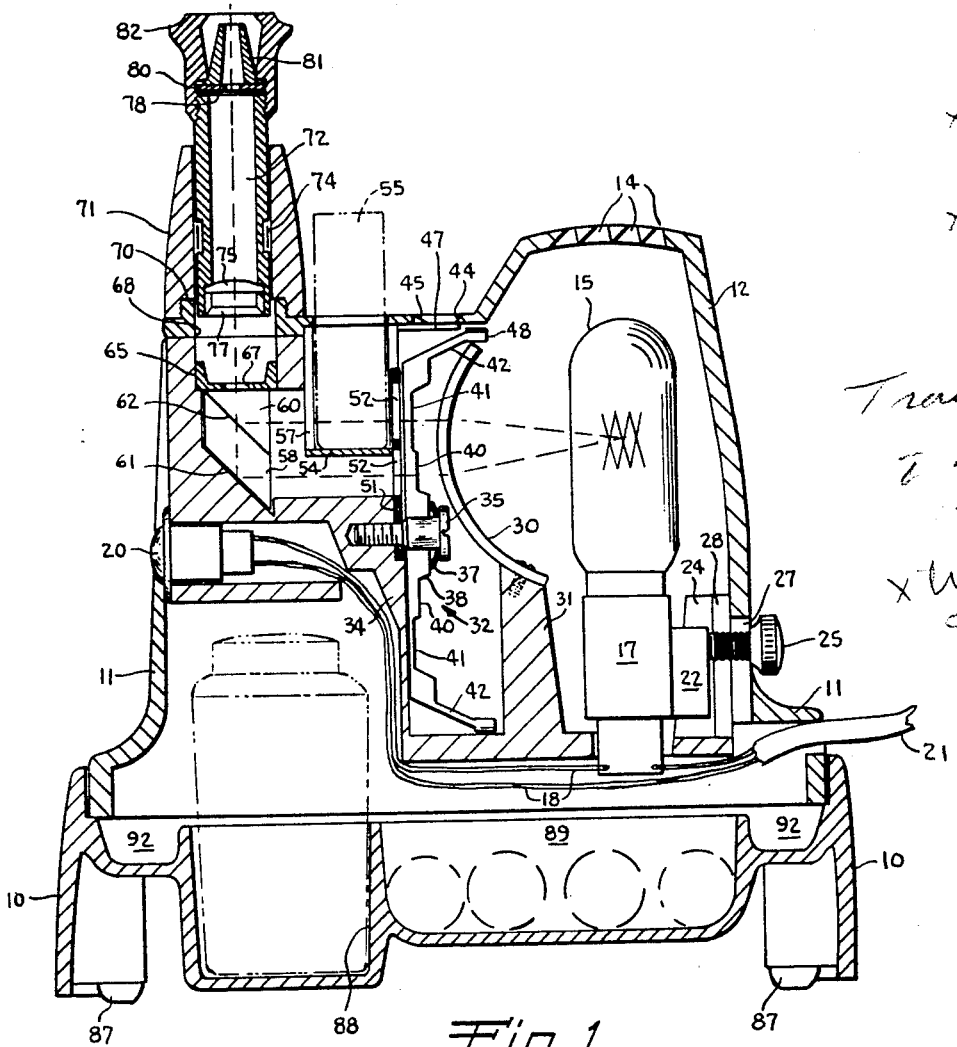
Figure 1 is a vertical section through a hemoglobinometer embodying the invention, the section being taken along line 1—1 of Figure 2.

Having reference now to the drawings, wherein like reference numbers designate the same parts in all the views, the hemoglobinometer is enclosed in a housing of approximately the size shown in Figure 1, the housing comprising a base portion 10 and a removable top portion 11. Top portion 11 includes a light box 12 having ventilating apertures 14, and mounted in the light box is the light source in the form of a lamp 15. Lamp 15 may be of the type that is commonly used to light the interior of a refrigerator, or it may be any one of various other commercially available types.

The lamp is supported in a double base, bayonet type socket 17 which is connected to one of the leads 18 extending between a push button switch 20 on the front of the housing and the exterior cord 21, the latter having the usual male plug for attachment into any convenient outlet. The position of the lamp 15 is adjustable vertically by means of a slide 22 fixed to the socket 17 and positioned between the sides of a U-shaped bracket 24 secured to the housing. An adjustment screw 25 extends through aligned slots 27, 28 in the housing and bottom of the bracket, and is threaded into the slide to hold it against the bottom of the bracket in properly adjusted position. The vertical lamp adjustment is provided since the filament in commercially available lamps is not always positioned at the same height in the glass envelope and it is desirable to locate the filament so that it is approximately opposite the center of the light diffusing member 30, as shown in Figure 1. Normally, this adjustment will be made initially by the manufacturer of the device and it will not be necessary to make further adjustment until the lamp burns out and is replaced by a new one.

The light diffusing member 30 is arcuate in shape and is mounted on a column 31 in the housing so that its center of curvature coincides with the approximate center of the lamp filament. In the preferred embodiment of the invention, the diffusing member is formed of a 25% opaque Plexiglas material, although it will be apparent that other types of material can be used as well. The primary purpose of diffusing member 30, of course, is to disperse the light uniformly over its area so that an even surface of light is presented to the optical system of the hemoglobinometer.

Positioned in front of the diffusing member 30 and its supporting column 31 is the optical wedge, generally indicated at 32. The wedge is of substantially circular or discoidal conformation and is rotatably mounted on an interior wall 34 of the housing by means of a shouldered screw 35. A spring pressure washer 37 is positioned between the head of the screw and the center boss 38 on the wedge and bears against the boss so that the wedge will be frictionally held in any adjusted position. Wedge 32 is formed with an annular constant reading portion 40 and an annular variable reading portion 41, and the wedge is mounted in the housing so that a sector of these portions will always be positioned opposite the central portion of the diffusing member 30 and will transmit the light emanating therefrom. The exact construction of the wedge, and particularly of the constant and variable reading portions 40, 41, will be described in detail hereinafter, but it should be noted at this time that the amount of light transmitted by the constant reading portion 40 is always the same at any point around the portion, while the amount of light transmitted by the variable reading portion 41 varies uniformly at progressive points around the portion, the amount of light transmitted by the variable portion being greater than that transmitted by the constant portion at every point except one where the transmission is equal.

Figure 2:
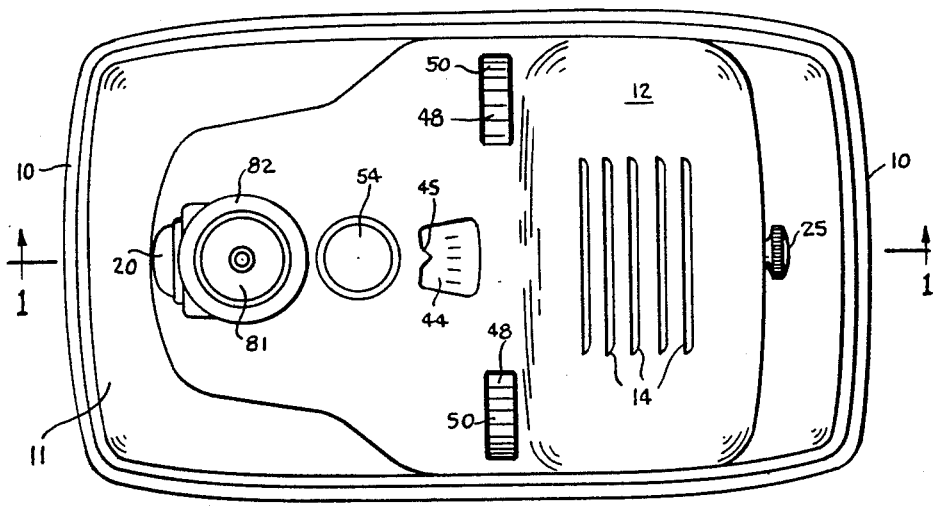
Figure 2 is a top plan view of the hemoglobinometer of Figure 1.

The wedge 32 is formed with an obliquely disposed rim portion 42 which bears the calibration indicia of the wedge. This rim is translucent and is illuminated by the light on the surface of the diffusing member 30, the rim and indicia being observable through a window 44 in the top of the housing. Window 44 is formed with a pointer 45, Figures 1 and 2, and is sealed with a piece 47 of clear Celluloid or the like to prevent dust and dirt from getting into the interior of the hemoglobinometer. The outer peripheral edge of the rim portion 42 is thickened as indicated at 48, and segments of this edge project through oppositely disposed openings 50 in the sides of the housing to give access to the wedge for turning adjustment, the edge being scalloped or serrated as shown to facilitate such adjustment.

Mounted directly in front of the wedge 32 is a mask 51 which is secured in position by means of the wedge supporting screw 35. Mask 51 is formed with a pair of substantially rectangular openings 52 located opposite the constant and variable reading areas of the wedge respectively. In front of the upper opening 52, opposite the variable reading portion 41 of the wedge, the housing is formed with a cup-like support 54 which is open at the top and is adapted to receive an ordinary Kahn vial indicated in dash lines at 55. The vial contains the blood solution being tested, and the vial support 54 is cut away on opposite sides thereof as shown at 57 to permit the light transmitted by the variable reading wedge portion 41 to pass diametrically through the vial and solution therein. In many of the devices of the prior art the light was directed through the bottom of the vial and followed an axial path through the solution. However, it has been found that no two vials are exactly alike with respect to the glass formation at the bottoms thereof, and slight variations in thickness as well as swirls and other imperfections made it necessary to make an initial compensating adjustment for each vial. Passing the light diametrically through the vial eliminates the necessity for such an adjustment since the side walls of the vials can be manufactured with such close tolerances that all vials of the same capacity can be regarded as being the same with respect to this dimension. A further advantage of directing the light diametrically through the vial is that the amount of light transmitted by the blood solution is in no way affected by the amount of solution in the vial.

Figure 4:
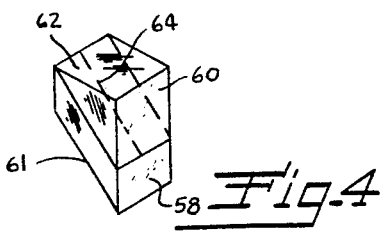
Figure 4 is a perspective view of the prism and mirror unit of the hemoglominometer.

Mounted in the front wall of the housing opposite the constant and variable reading portions 40, 41 of the wedge is the prism and mirror unit of the hemoglobinometer which includes a rhombic prism 58 and a standard or right triangle prism 60, Figures 1 and 4, the prisms being cemented together as with a balsam seal. The under side of the rhombic prism is silvered throughout to provide a full lower mirror 61, while the hypotenuse or abutting side of the standard prism is silvered on its left side only (as viewed in Figure 4) to provide an upper half mirror 62, the latter having a sharp inner edge 64. The under side of the lower mirror 61 is protectively coated and the upper mirror 62 is sealed between the prisms so that none of the silvered surfaces are exposed to the air or able to collect dust. The prism and mirror unit changes the direction of the light rays by exactly 90° and is precisely located in the housing so that the lower mirror 61 picks up the light transmitted by the constant reading portion 40 of the wedge and the upper mirror 62 picks up the light transmitted by the variable reading portion 41 of the wedge and the blood solution, the light received by both mirrors being directed up into the eyepiece.

Figure 5:
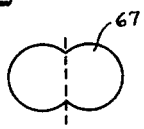
Figure 5 is an outline of the pattern aperture of the hemoglobinometer.

A cup shaped member 65 is positioned directly above the standard prism 60, and the bottom of this member is formed with a pattern aperture 67 in the shape of a pair of overlapping circles, Figure 5. The pattern aperture is observed through the eyepiece of the hemoglobinometer and, due to the prism and mirror arrangement just described, the left half or side of the aperture is illuminated by light transmitted by the constant reading wedge portion 40 and the right half or side of the aperture is illuminated by light transmitted by the variable reading wedge portion and blood solution. The pattern aperture 67 is formed as shown because the light illuminating the two halves thereof must be balanced or adjusted to equal intensity in order to obtain a reading and it has been found that an aperture of this shape greatly facilitates balancing the two light masses due to the fact that the observer's eye naturally focuses on the intersection line of the circles which is the dividing line between the two masses.

Directly above the pattern aperture member 65, the housing is formed with an opening 68 which is encircled by a threaded boss 70 to which the eyepiece socket member 71 is detachably secured. The tubular eyepiece neck 72 is telescopically mounted in the socket member, and a pressure spring 74 is positioned between the parts to frictionally retain the neck in any adjusted position. The eyepiece lens 75 is supported in the lower end of the neck by means of a retaining collar 77, the lens having a 1½" focus with the distance variable so that the neck can be moved up or down in the socket member to permit adjustment for the eyes of the individual observer. This enables the observer to bring the edge of the split mirror 62 into focus, although sharp focus is not necessary in order to obtain accurate results. The upper end of the eyepiece neck 72 supports a green filter 78 since the latter is opaque to the red rays of the blood solution. It will be understood, however, that filters of other colors can be substituted when other substances, as for example urine, are being tested. Positioned above the filter is a plate 80 having a guiding aperture therein which serves as a rear sight to aid the observer in centering the pattern aperture in the lens. The filter and guiding aperture plate are surmounted by the eyepiece cone 81 which is adapted to eliminate the light halo and also serves to place the filter 78 sufficiently deep in the eyepiece to eliminate surface reflection. The filter, aperture plate and cone are all secured in position by an eyepiece cap 82 which is threaded onto the upper end of the neck 72.

Figure 7:
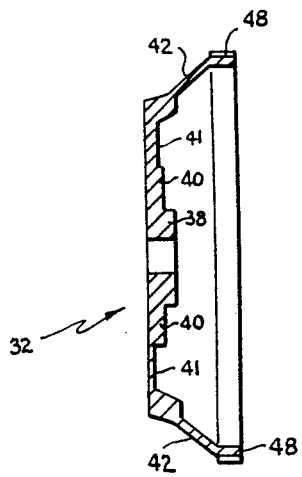
Figure 7 is a vertical section through the wedge taken along line 7—7 of Figure 6.
Figure 6:
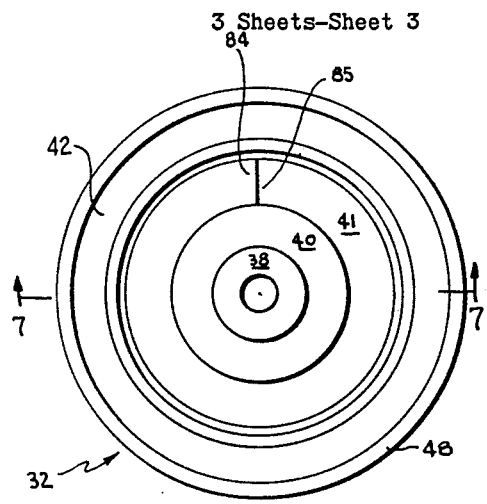
Figure 6 is a top plan view of the optical wedge of the hemoglobinometer.
Figure 8:
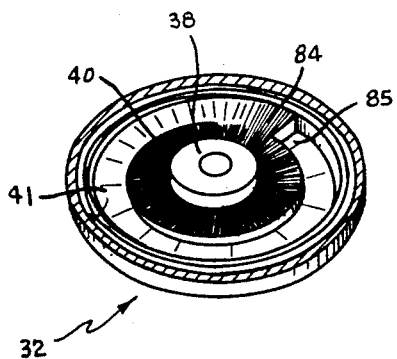
Figure 8 is a perspective view of the wedge with the obliquely disposed rim portion thereof broken away.

Having reference now to Figures 6, 7 and 8, the optical wedge 32 is preferably formed of colored or tinted plastic material of uniform color density, which means that the coloring matter is dispersed throughout the material with nearly absolute uniformity. For wedges used in hemoglobinometers, the color is a warm gray-purple which, when used with a green filter, has a color vibration ray absorption of the red fields and associated hues from yellow to red-brown, the color being particularly balanced for the red of the blood solution.

The constant and variable reading portions 40, 41 of the wedge are concentric with the center boss 38, and the constant reading portion is of uniform thickness throughout while the variable reading portion is of uniformly decreasing thickness. The variable reading portion is thickest at the point 84, where its thickness is equal to that of the constant reading portion, and from this point it decreases uniformly through 360° to its thinnest point at 85, the two points being separated by a radial shoulder as shown in Figure 8 wherein the obliquely disposed rim portion 42 of the wedge is broken away for greater clarity.

Since the material from which the wedge is formed is of uniform color density, the variation in the thickness of the variable reading portion 41 will cause it to vary in shade from dark to light between its thickest and thinnest points or, in other words, will cause it to vary from maximum to minimum opacity between these points. The opacity at any point, of course, determines the amount of light transmitted at that point so it will be seen that in a wedge formed as above described the amount of light transmitted is actually dependent upon the thickness of the material. Accordingly, since the constant reading portion 40 is of uniform thickness throughout, it will transmit the same amount of light at every point around its center, while the variable reading portion will transmit the same amount of light as the constant portion at the point where the thickness of the portions is equal and a greater amount of light at every other point around its center where its thickness is less, the difference in the amount of light transmitted increasing gradually to a maximum at the thinnest point on the variable portion. The difference in the amount of light transmitted by the two portions at any point or degree around their common center is, therefore, directly dependent upon the difference in thickness between the two portions at that point, and this difference can be physically measured on the wedge itself which can be calibrated accordingly in terms of any desired scale.

When the wedge is adjusted so that the light observed in both halves of the pattern aperture 67 is of equal intensity, the difference in the amount of light transmitted by the constant and variable reading portions of the wedge will represent or be equal to the amount of light transmitted by the blood solution. This difference, as explained just above, is physically measurable on the wedge itself and it will be apparent therefore that this type of wedge permits a positive and accurate determination of the amount of light transmitted by the blood solution, or other substance being tested, since the determination is reduced to a purely subtractive mechanical operation. The calibration of the wedge at various points around its center will therefore be a function of the difference in thickness between the two reading portions at those points, and it follows that every other wedge having the same differences in thickness between its reading portions can be identically calibrated. The calibration indicia for the wedge is located on the obliquely disposed rim portion 42, and the scale can if desired be in terms of percentage content of hemoglobin. However, in view of the fact that there are different normals for different geographical areas, it may be preferable to provide a more general scale, as for example one in terms of optical density, and transpose the reading by means of a graph or slide rule chart.

The wedge 32 is cast, being formed with very accurately machined steel dies. One half of the die set forms the irregular side of the wedge and therefore determines the differences in thickness between the constant and variable reading portions of the wedge. Thus, even though uneven die blows or other conditions result in castings that are non-uniform as to overall thickness, the differences in thickness between the two reading portions will still be the same in each one. This fact, plus the fact that the die which forms the irregular side of the wedge also imprints the calibration indicia on the rim, makes it possible to produce the wedge by mass production methods, thereby greatly reducing the total cost of the hemoglobinometer.

As noted just above, variations in the overall thickness of a number of wedges in no way affects their calibration or the accuracy of the reading because the same half of the die set determines the differences in thickness between the constant and variable reading portions in each wedge and only these differences are measured. Similarly, the accuracy of the reading is not affected by the intensity of the light source since, if a weaker lamp is used for example, less light is transmitted by both of the reading portions of the wedge, but the difference in the amount transmitted at any point remains the same. These advantages are not found in the previously developed optical wedges where the wedge has a variable reading portion only. In these wedges, the variable light transmitting or graded portion is an independent unit and is balanced against something outside the wedge. Thus, even though the graded portions in a pair of these wedges are identical, if one is relatively darker or more opaque throughout than the other, the readings obtained from the wedges will not be the same. This situation, unfortunately, results in a lack of interchangeability and leads to inaccurate readings. Moreover, most of these wedges that are formed by a pigment suspended in gelatine method or a progressive photographic exposure method are not identical to one another with respect to their variable reading portions so that it is usually necessary to calibrate each wedge individually thereby making it impossible to mass produce them.

While the optical wedge disclosed herein has been particularly described with reference to a circular or discoidal, three-dimensional construction, other constructions embodying the principle of this wedge are possible and are intended to be included herein. For example, the wedge can be made in straight, three-dimensional form and be slidably mounted in the hemoglobinometer. A wedge of this construction will have adjacent elongated constant and variable reading portions with the latter sloping downwardly alongside the former in the manner of an inclined plane. The wedge can also be made in strip form using high resolution film having a constant reading portion of uniform opacity and a variable reading portion graded from the opacity of the constant reading portion down to the point of transparency. With the very high resolution films available at the present time, the gradation in the variable reading portion can be made with substantially the same uniformity as is obtained in the variable reading portion of the three-dimensional wedges by means of an accurately machined forming die. With this strip wedge, the amount of light transmitted by the substance being tested will, of course, be determined from the difference in the amount of light transmitted by the constant and variable reading portions of the wedge, the determination being a function of the physical characteristics of the wedge itself as in the wedges previously described. The wedge is therefore unlike other photographically produced wedges which have no constant reading portion. In the latter, as noted above, over development or under development may cause some wedges to be darker or lighter throughout than others, and since chemicals are involved, the development is hard to control. With the strip wedge having a constant as well as a variable reading portion, however, this is not a problem because over or under development affects both reading portions in the same manner so that the differences in the amount of light transmitted by the portions will still be the same in every case.

Figure 3:
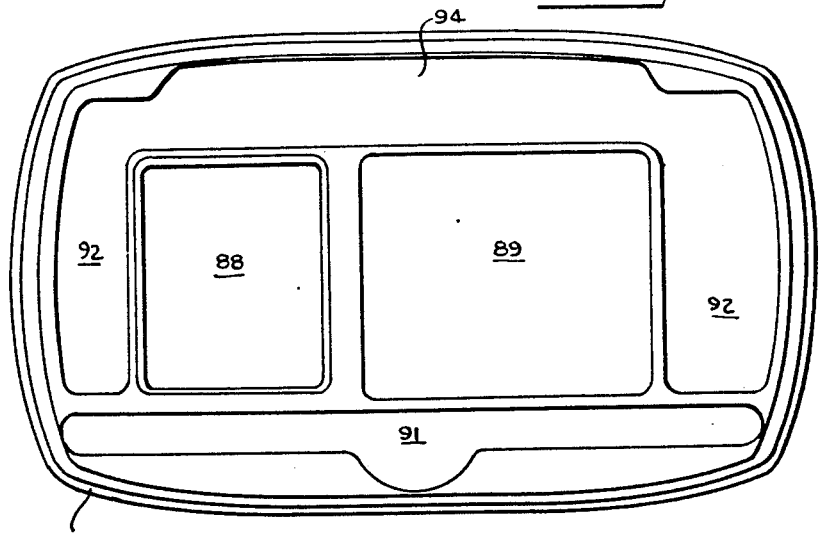
Figure 3 is a top plan view of the base portion of the hemoglobinometer housing.

Having reference now to Figures 1 and 3, the base portion 10 of the hemoglobinometer housing is provided with rubber feet 87 to prevent the device for sliding about on a desk or table top, and the interior of this portion is compartmented for the storage of supplies and equipment used in connection with the hemoglobinometer. The compartments 88 and 90 are relatively deep and are adapted to respectively hold the bottle containing the diluent with which the blood sample is mixed and the vials in which the blood solution is placed for testing, these containers being indicated in dash lines in Figure 1. The shallower compartments 91, 92 are adapted to respectively hold the pipette and the rubber pipette tube, compartment 92 being widened at 94 to support the needle or knife used in drawing the blood.

The operation of the hemoglobinometer is as follows: The blood drawn from the patient is first measured accurately in the pipette and then mixed in one of the vials 55 with a measured amount of a standard diluent. The switch 20 is actuated to turn on the lamp 15, and the observer adjusts the eyepiece neck 72 up or down to bring the image of the edge of the split mirror 62 into focus. Thereafter, the vial and blood solution are placed in the vial support 54 in the housing, and as the observer looks through the eyepiece he will see on the left half of the pattern aperture 67 light rays from the surface of the diffusing member which have been transmitted by the constant reading portion 40 of the wedge, and on the right half of the pattern aperture light rays from the surface of the diffusing member which have been transmitted by the variable reading portion 41 of the wedge and the blood solution. The light observed in the pattern aperture will have no color due to the green filter 78 and color of the wedge previously described, but before any adjustment of the wedge is made the light intensity in the two halves of the aperture will normally be unequal. The wedge will therefore be adjusted until the intensity of the light is equal in both halves of the aperture. This, as has been explained in detail hereinbefore, means that the wedge is at the point where the amount of light transmitted by the variable reading portion and the blood solution together is exactly equal to the amount of light transmitted by the constant reading portion or, stated in another manner, that the wedge is at the point where the amount of light absorbed by the variable reading portion plus the amount of light absorbed by the blood solution exactly equals the amount of light absorbed by the constant reading portion. The reading for this point on the wedge can then be observed through the window 44 by noting where the pointer 45 registers with the scale on the wedge rim portion 42.

From the foregoing description it will be apparent that the invention disclosed herein provides a greatly improved hemoglobinometer, or like device, which is highly accurate and yet is simple in construction and economical to produce. This invention may be embodied in other specific forms without departing from the spirit or essential characteristics thereof. The embodiment disclosed is therefore to be considered in all respects as illustrative and not restrictive, the scope of the invention being indicated by the appended claims.

What I claim is:

1. An optical comparison unit of uniform color density throughout having two adjacent translucent portions adapted to transmit light rays from a single light source, a portion of the light being absorbed thereby during transmission, one of said portions being of uniform thickness throughout and the other portion being of uniformly decreasing thickness, the maximum thickness of said last-named portion being equal to the thickness of said first-named portion, the difference in thickness between the two portions at any point being directly proportional to the difference in the amount of light absorbed by said portions at that point thereby enabling accurate determination of the latter from the mechanical configuration of the unit.

2. A unitary, calibrated optical wedge of substantially discoidal conformation adapted to be rotatably supported at its center, said wedge being of uniform color density throughout and having a pair of concentrically arranged translucent reading portions adapted to transmit light rays from a single light source, a portion of the light being absorbed thereby during transmission, the inner reading portion being of uniform thickness throughout and the outer reading portion being of uniformly decreasing thickness, the maximum thickness of said outer portion being equal to the thickness of said inner portion, the difference in thickness between the two portions at any degree around the center thereof being directly proportional to the difference in the amount of light absorbed by said portions at that point thereby enabling accurate calibration of the latter from the mechanical configuration of the wedge, said wedge including an obliquely disposed rim portion bearing the calibration indicia for the wedge.

3. An optical wedge having adjacent constant and variable reading portions, said constant reading portion being of uniform opacity throughout and said variable reading portion being of uniformly decreasing opacity, the maximum opacity of said variable reading portion being equal to the opacity of said constant reading portion, said wedge being calibrated on the basis of the difference in opacity between said portions at any point on said wedge.

References Cited in the file of this patent

UNITED STATES PATENTS

| | | |
|---|---|---|
| 1,390,422 | Bennett | Sept. 13, 1921 |
| 1,400,356 | Fuchs | Dec. 13, 1921 |
| 1,878,847 | Hauser et al. | Sept. 20, 1932 |
| 2,163,467 | Philipsen | June 27, 1939 |
| 2,213,534 | Rowe | Sept. 3, 1940 |
| 2,331,027 | Harrison | Oct. 5, 1943 |
| 2,355,960 | Duffie | Aug. 15, 1944 |

FOREIGN PATENTS

| | | |
|---|---|---|
| 637,009 | Great Britain | May 10, 1950 |
| 765,408 | Germany | Oct. 18, 1954 |